United States Patent [19]

Panchanathan

[11] Patent Number: 5,725,792
[45] Date of Patent: Mar. 10, 1998

[54] BONDED MAGNET WITH LOW LOSSES AND EASY SATURATION

[75] Inventor: Viswanathan Panchanathan, Anderson, Ind.

[73] Assignee: Magnequench International, Inc., Anderson, Ind.

[21] Appl. No.: 632,722

[22] Filed: Apr. 10, 1996

[51] Int. Cl.$^6$ ............................................. C04B 35/04
[52] U.S. Cl. ............... 252/62.54; 148/302; 148/104; 252/62.55
[58] Field of Search ....................... 148/302, 104; 252/62.54, 62.55

[56] References Cited

U.S. PATENT DOCUMENTS 5,049,208  9/1991  Yajima et al. ................. 148/302
5,449,417  9/1995  Shimizu et al. ................. 148/302

FOREIGN PATENT DOCUMENTS 0 242 187  4/1987  European Pat. Off. ........... 148/302
0 362 812  4/1990  European Pat. Off. ........... 148/302

*Primary Examiner*—John Sheehan
*Attorney, Agent, or Firm*—Pennie & Edmonds LLP

[57] ABSTRACT

The present invention provides a bonded isotropic magnet containing a composition comprising from about 5 to 25% rare earth metal, from about 0.5 to about 4.5% boron, from about 0.5 to about 3.0% niobium, and the balance principally of iron. Such a magnet exhibits low coercivity and low loss upon aging.

11 Claims, 1 Drawing Sheet

% Loss = (B1-B2)/B1%

BONDED MAGNET WITH LOW LOSSES AND EASY SATURATION

BACKGROUND

There is a great demand for bonded magnets made from low rare earth compositions. They can be used for office automation, computer peripherals, and consumer electronic applications. The process of making these can take place through melt-spinning, which produces powder having desirable microstructure from the melt.

Magnets suffer irreversible losses after aging at a particular temperature. The magnet losses increases with increasing time and elevated temperature. It was generally recognized in the past that the initial coercivity of a magnet at room temperature determines the loss behavior of the magnet. It was thought that in general the lower the coercivity the higher the losses and vice versa. Thus the coercivity of the magnet should be high to reduce the losses; however this leads to difficulty in saturation. Much work has been expended in finding the precise alloy composition which will yield a magnet with the apparent contradictory properties of easy saturation behavior, low coercivity, and low aging losses. Such magnets would find application as multipole magnets where saturation is difficult.

BRIEF SUMMARY

The present invention provides bonded magnets with low rare earth compositions which have easy saturation behavior, low coercivity (<10 kOe, preferably <8kOe), and low aging losses. This invention overcomes high aging losses associated with low coercivity through the addition of niobium which reduces the losses on aging. The bonded magnets produced after annealing, mixing with epoxy, and curing have aging losses of less than 4% after heating at 80° C. for 2000 hours and less than 6% at 100° C. after 2000 hours.

The magnets are made from an alloy composition having by weight as follows: from about 5% to about 25% total rare earth metal ("TRE"), with at least 95% of this constituent being neodymium and the remainder being essentially praseodymium, from about 0.5% to about 4.5% boron wherein the total of said rare earth metal and said boron ranges from about 9% to about 26%, from about 0.5% to about 3.0% niobium, and the balance principally of iron. The preferred ranges are TRE about 10 to about 20%, B about 0.8 to about 4.0%, Nb about 1 to about 2.5% and the balance principally of Fe. The preferred range of total rare earth metal and boron is from about 12% to about 22%. Higher amounts of TRE are not preferred since Hci will be high and saturation will be difficult. Lower amounts of TRE are also not preferred since the Hci values are low and not of commercial significance. The correct B and TRE values help in obtaining the correct microstructure of hard magnetic 2-14-1 phase with the soft phase of $\alpha$-Fe and/or $Fe_3B$. Cobalt reduces both $B_r$ and Hci; however, it is recommended for some applications where low temperature coefficient of $B_r$ is desired. The alloy composition may comprise up to 16% of cobalt.

Other metals may also be present in minor amounts of up to two weight percent, either alone or in combination. These metals include tungsten, chromium, nickel, aluminum, copper, magnesium, manganese, gallium, vanadium, molybdenum, titanium, tantalum, zirconium, carbon, tin, and calcium. Silicon is also present in small amounts, as are oxygen and nitrogen.

Generally, permanent magnetic bodies of the preferred compositions are formed by starting with alloy ingots which are melted by induction heating under a dry, substantially oxygen-free argon, inert or vacuum atmosphere to form a uniform molten composition. Preferably, the molten composition is then rapidly solidified in an inert atmosphere or a vacuum to produce an amorphous material or a finely crystalline material in which the grain size is not more than about 500 nanometers, preferably less than about 400 nanometers, at its largest dimension. It is most preferred that the rapidly solidified material have a grain size smaller than about 20 nanometers. Such material may be produced, for example, by conventional melt spinning operations. The alloys of the preferred composition are melt spun at 22 m/sec., a step which forms ribbons with either amorphous or microcrystalline structure across the thickness of the ribbon.

The ribbons are comminuted into a fine powder, preferably of average particle of 200 microns using a roll crusher.

The resulting powder is annealed, preferably at 700° C. for a duration of approximately 4 minutes under argon. After annealing, the grain size is in the range of approximately 20 to approximately 500 nanometers, preferably between 20 and 100 nanometers.

The annealed powder is then mixed with a bonding agent which may later be hardened to form a self-supporting, unmagnetized, but magnetizable green compacts. The binding agent may be a hardenable resinous substance such as epoxy of 2% weight for compression molding. Since the powder is isotropic, no alignment field is necessary during bonding, which allows for faster cycle times. The finished magnets can be magnetized in any direction, allowing for greater design flexibility.

The green compacts are cured, preferably at a temperature of 170° C. for a duration of 30 minutes. The epoxy is cured and the bonded magnet thus formed can be used for further application. The green compacts may be compression molded.

Bonded magnets may also be made by processes other than compression molding. They include injection molding, calendering, extrusion, etc. While this invention refers to bonded magnets made by compression molding, similar or better results are to be expected for bonded magnets made by other processes especially where such magnets contain higher amounts of binders.

To test the loss properties of the resulting magnet, it is aged preferably at a temperature of 80° C. for a duration of 2 hours.

DETAILED DESCRIPTION AND EXAMPLES

Example 1

Figure 1:
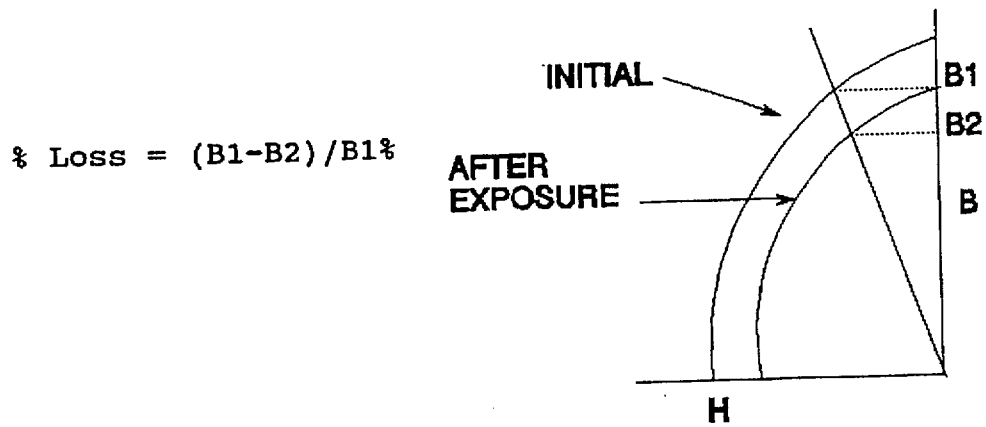
FIG. 1 illustrates the demagnetization curves of the bonded magnet of the present invention magnetized at 40 kOe before and after annealing.
Figure 2:
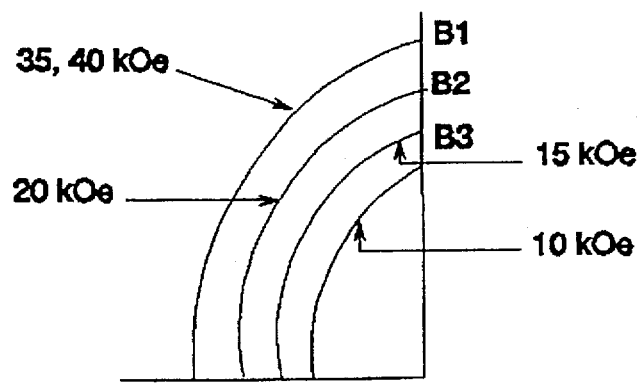
FIG. 2 illustrates the demagnetization curves of the bonded magnet of the present invention magnetized at 10 kOe, 15 kOe, 20 kOe and 35 (or 40) kOe, respectively.

The alloys of the following composition were melt spun at 22 m/sec. The alloys are composed of rare earth, boron and the balance iron. At least 95% of the total rare earth constituent is neodymium and the remainder being essentially praseodymium. The ribbons were comminuted into powder of average particle size 200 μm. It was annealed at 700° C. for 4 min. The powder was mixed with epoxy (2% wt) and green compacts were made by compression molding process. They were cured at 170° C. for 30 min. The bonded magnets thus made were aged at 80° C. for 2 hrs. The losses were measured for samples A to G. They are given in the table below:

|   | TRE % | B % | Hci, kOe | Losses, % |
|---|---|---|---|---|
| A | 15 | 1.5 | 1.3 | >10 |
| B | 16 | 1.4 | 1.4 | >10 |
| C | 17 | 1.3 | 1.7 | >10 |
| D | 18 | 1.2 | 3.6 | 8 |
| E | 19 | 1.1 | 4.0 | 8 |
| F | 18.5 | 1.2 | 3.8 | 8 |
| G | 19.5 | 1.2 | 4.2 | 8 |

Example 2

Alloys of the following composition were melt spun, annealed and bonded magnets were made as given in Example 1. The alloys are composed of rare earth, boron and the balance of iron, optionally containing Co or Nb. At least 95% of the total rare earth constituent is neodymium and the remainder being essentially praseodymium. The properties are as follows for samples H to N:

|   | TRE % | B % | Others | Br, kG | Hci, kOe |
|---|---|---|---|---|---|
| H | 18.0 | .99 | — | 10.1 | 4.3 |
| I | 19.0 | 1.0 | — | 9.94 | 4.3 |
| J | 21.3 | 1.6 | — | 8.43 | 4.93 |
| K | 21.9 | 1.9 | — | 8.06 | 4.64 |
| L | 18.0 | 1.03 | Co 2.5 | 9.93 | 3.53 |
| M | 18.0 | .85 | Co 10.7 | 9.24 | 2.99 |
| N | 18.0 | 1.07 | Nb 1.8 | 8.68 | 5.02 |

As can be seen, Co-addition decreased $B_r$ and Hci. Niobium addition decreased $B_r$; however, Hci is increased.

Example 3

Bonded magnets were made from samples H and N as detailed in Example 1. They were aged at 80° C. and 100° C. for up to 2000 hrs. The losses were measured.

|   | Losses % | |
|---|---|---|
|   | Sample H | Sample N |
| 80° C. | 10 | 3.7 |
| 100° C. | 15 | 5.2 |

The losses after aging at 80° and 100° C. for 2 hours are less than 0.5% and 1%, respectively for sample N. Similar values for sample H are 5% and 8%, respectively at 80° and 100° C. Thus the magnet containing niobium exhibits much lower losses not only after short term aging of 2 hours but also after aging up to 2000 hours.

Example 4

Bonded magnet samples H and N of Example 3 were saturated at different fields. The table below shows the saturation behavior for both of the magnets:

|   | By Saturation % | |
|---|---|---|
| Field, kOe | Sample H | Sample N |
| 10 | 60 | 67 |
| 15 | 83 | 90 |
| 20 | 91 | 96 |

Note the Nb containing magnet having higher Hci can be saturated much better than the one without Nb, which has lower Hci.

Thus, this invention relates to magnets made using composition TRE 5–25%, B 0.05–4.5%, TRE+B 9 to 26%, Nb 0.5–3.0%, Fe, the balance, has got lower losses and better saturation behavior.

The following outlines the methods used in the examples to measure aging losses and degree of saturation of the bonded magnets.

AGING STUDY

The magnet is pulse magnetized at 40 kOe. The demagnetization curve is taken. The initial flux value corresponding to the load line of the magnet is determined. It is magnetized at 40 kOe and kept in an oven at the desired temperature and time. Afterwards the magnet is removed from the oven, cooled to room temperature and the demagnetization curve is taken. The flux value is determined. The loss is expressed as a percent of the original value.

MAGNETIC MEASUREMENT

The magnet is magnetized to varying fields from 10 kOe to 40 kOe. For each field the demagnetization curve is taken. Beyond 35 kOe there is no further increase in the magnetic properties. The ratio of B3/B1 gives the % saturation at 15 kOe, and B2/B1 gives the saturation at 20 kOe etc.

I claim:

1. A bonded isotropic magnet comprising a bonding agent and melt spun crystalline particles formed from a composition comprising, on a weight basis, from about 5 to about 25 % rare earth metal, from about 0.5 to about 4.5 % boron wherein the total of said rare earth metal and said boron ranges from about 9 to about 26 %, from about 0.5 to about 3.0% niobium, and the balance principally of iron, said magnet having a coercivity of less than 10 kOe.

2. The magnet of claim 1 wherein the composition comprises up to about 16% of Co.

3. The magnet according to claim 1 wherein the composition comprises, on a weight basis, from about 10 to about 20% rare earth metal, from about 0.8 to about 4.0% boron, from about 1.0 to about 2.5% niobium, and the balance principally of iron.

4. The magnet according to claim 1 wherein the majority of said rare earth metal is neodymium and/or praseodymium.

5. The magnet according to claim 1 wherein said isotropic particles have an average particle size of 200 microns.

6. A bonded isotropic magnet comprising an epoxy bonding agent and melt spun crystalline particles formed from a composition comprising, on a weight basis, from about 5 to about 25% rare earth metal, from about 0.5 to about 4.5% boron wherein the total of said rare earth metal and said boron ranges from about 9 to about 26%, from about 0.5 to about 3.0% niobium, and a balance principally of iron, said melt spun crystalline particles having a microstructure of 2-14-1 with soft phase of $\alpha$-Fe and/or $Fe_3B$, said magnet having a coercivity of less than 10 kOe.

7. The magnet according to claim 6 wherein the composition comprises, on a weight basis, from about 10 to about 20% rare earth metal, from about 0.8 to about 4.0% boron, from about 1.0 to about 2.5% niobium, and the balance principally of iron.

8. A bonded isotropic magnet comprising an epoxy bonding agent and melt spun crystalline particles formed from a composition comprising, on a weight basis, from about 5 to about 25% rare earth metal, from about 0.5 to about 4.5% boron wherein the total of said rare earth metal and said boron ranges from about 9 to about 26%, from about 0.5 to about 3.0% niobium, and a balance principally of iron, said magnet having a coercivity of less than 10 kOe, said magnet having greater than 60% saturation in a magnetic field of 10 kOe.

9. The magnet according to claim 8 that exhibits aging losses of less than 4% after heating said magnet at a temperature of 80° centigrade for 2000 hours.

10. The magnet according to claim 8 that exhibits aging losses of less than 6% after heating said magnet at a temperature of 100° centigrade for 2000 hours.

11. The magnet according to claim 8 wherein the composition comprises, on a weight basis, from about 10 to about 20% rare earth metal, from about 0.8 to about 4.0% boron, from about 1.0 to about 2.5% niobium, and the balance principally of iron.

\* \* \* \* \*